United States Patent [19]

Belart

[11] Patent Number: 4,678,242
[45] Date of Patent: Jul. 7, 1987

[54] HYDRAULIC VEHICLE BRAKE SYSTEM WITH ANTI-LOCKING

[75] Inventor: Juan Belart, Walldorf, Fed. Rep. of Germany

[73] Assignee: Alfred Teves GmbH, Frankfurt am Main, Fed. Rep. of Germany

[21] Appl. No.: 784,675

[22] Filed: Oct. 4, 1985

[30] Foreign Application Priority Data

Oct. 13, 1984 [DE] Fed. Rep. of Germany ....... 3437575

[51] Int. Cl.$^4$ ............................................. B60T 13/68
[52] U.S. Cl. ....................................... 303/92; 60/582; 303/114
[58] Field of Search ...................... 60/547.1, 563, 582; 303/2, 13, 92, 103, 114

[56] References Cited

U.S. PATENT DOCUMENTS 4,530,209  7/1985  Steffes ............................... 60/547.1
4,586,591  5/1986  Belart ................................ 303/92 X Primary Examiner—Duane A. Reger
Attorney, Agent, or Firm—James B. Raden; William J. Michals

[57] ABSTRACT

A hydraulic vehicle brake system with anti-locking, wherein a braking pressure generator (25) comprising a hydraulic power booster (26) and a master cylinder (27) connected downstream thereof is employed for the pressure supply of the brake circuits. Wheel brakes (37, 34) are connected to the pressurizable working chambers (31, 32) of the braking pressure generator (25) by way of first valves (33, 36), while the working chambers (31, 32) are connectible with an auxiliary pressure source (1) by way of second valves (46, 146). A third valve (60) is interposed between the auxiliary pressure source (1) and the second valves (46, 146), which can be switched to assume an open position in response to a pedal contact (6) and sufficient pressure of the auxiliary pressure source (1). The second valves (46, 146) are designed as double seat valves of the same kind, each including a piston (53, 153) which is slidable by the pressure in the respective brake circuit and which causes, in the brake pedal's release position, a hydraulic connection between the respective working chamber and an unpressurized supply reservoir (4). Upon a failure of one brake circuit, the anti-locking function will be maintained in the other brake circuits because each brake circuit has its own second valve.

5 Claims, 4 Drawing Figures

HYDRAULIC VEHICLE BRAKE SYSTEM WITH ANTI-LOCKING

BACKGROUND OF THE INVENTION

The present invention relates to a hydraulic vehicle brake system with anti-locking, wherein a braking pressure generator comprising a hydraulic power booster and a master cylinder connected downstream thereof is employed for the pressure supply of the brake circuits. Wheel brakes are connected to the pressurizable working chambers of the braking pressure generator by way of first valves. The working chambers are connectible with an auxiliary pressure source by way of second valves. A third valve is interposed between the auxiliary pressure source and the second valves which can be switched to assume a closed position in response to a pedal contact and the pressure of the auxiliary pressure source.

In German patent application No. P 34 27 070.1, a brake system of the type referred to is described, wherein a braking pressure generator is used which is substantially composed of a hydraulic power booster and a tandem master cylinder connected downstream thereof. Basically, the auxiliary pressure source consists of an electromotively driven pressure fluid pump which serves to charge a pressure fluid accumulator having a limited storage volume to a predeterminable pressure level during normal driving operation (i.e., without braking). At the outlet of the auxiliary energy source, a valve is connected which establishes a hydraulic connection between the auxiliary energy source and the working chambers of the tandem master cylinder when a predetermined pressure prevails at the outlet of the auxiliary energy source. This connection can be established by virtue of sealing sleeves which are arranged between end faces of the master cylinder pistons close to the pedal and the working chambers of the tandem master cylinder and which are caused to assume their opened position in the presence of a corresponding pressure gradient.

The brake system described is more specifically designed for a dual-circuit brake system, wherein to each working chamber of the tandem master cylinder one brake circuit is connected. A component of the valve assembly is a piston which sets the valve mechanism into operation and which can be acted upon by the pressure built up in the pressure chamber of the hydraulic power booster. Inserted between the outlet of the auxiliary energy source and the valve connected upstream of the master cylinder is a so-called safety valve which normally assumes its closed position and which is switched to its opened position on brake application.

The hydraulic power booster of the known brake system includes a brake valve which, when the brake pedal is applied by force, permits development of a pressure in the pressure chamber of the hydraulic power booster which is proportional to the force exerted on the brake pedal. Furthermore, when the brake pedal is depressed, a brake pedal contact will be made, as a result whereof the pressure fluid pump is put into operation by way of an electric motor. In the initial phase of brake actuation, the pressure fluid volume necessary for the hydraulic power boosting is taken from a pressure fluid accumulator with limited storage volume, whereby the start-up period or, respectively, the rate of delivery of the pressure fluid pump which is reduced in the start-up period will be compensated.

On depression of the brake pedal, a safety valve also will assume its opened position, the safety valve being arranged between the outlet of the pressure fluid pump an the valve. Simultaneously, the pressure which developed in the pressure chamber of the hydraulic power booster pressurized a piston of the valve which, due to this pressurization, displaces such that the end surfaces of the valve close to the pedal are isolated from the unpressurized supply reservoir. In the event of a pressure increase at the outlet of the auxiliary energy source, valve passages within the valve will adopt their opened position, so that the end surface of the master cylinder pistons close to the pedal are connected to the outlet of the auxiliary energy source.

It is a disadvantage in the brake system described that the system is designed for a dual-circuit brake system, each individual brake circuit being connected to one working chamber of the tandem master cylinder. Further, upon the occurrence of leakage in one circuit, it will not be possible without further efforts to perform a brake slip control action in the other brake circuit.

It is therefore an object of the present invention to improve upon a hydraulic vehicle brake system with anti-locking of the type referred to in such a manner that the brake system can be designed to comprise three circuits, on the one hand, and that the anti-locking function is preserved, on the other hand, if any one of the brake circuits connected to the braking pressure generator fails.

SUMMARY OF THE INVENTION

This object is achieved by the present invention in that the second valves are designed as double seat valves of the same kind, each double seat valve disposing of a piston which is displaceable by the pressure in the respective brake circuit and by which a hydraulic connection is provided in the brake's release position between the respective working chamber and an unpressurized supply reservoir. In this manner, each brake circuit is provided with a valve which is controllable by the pressure prevailing in the respective brake circuit. Therefore, even on failure of one brake circuit, it is possible to preserve the anti-locking function in the other brake circuits. Further, the safety valve normally assumes a closed position and is adapted to switch to its opened position on brake actuation by means of a contact allocated to the brake pedal. A like arrangement prevents inadvertent pressurization of a brake circuit.

According to a preferred embodiment of the subject matter of this application, the auxiliary energy source is connectible by way of the safety valve to a pressure switch, the pressure switch interrupts the current supply to the safety valve in the event of the pressure of the auxiliary energy source falling below a predeterminable level. In a like case of malfunction in which the auxiliary energy source is not capable of furnishing sufficient pressure for the pressure supply of the hydraulic brake system, only the working chambers of the tandem master cylinder connected downstream of the hydraulic power booster and, respectively, the brake circuits connected thereto can be pressurized. This is done in a like case of malfunction exclusively by the application of force on the brake pedal. Since the safety valve adopts a closed position in a like case of malfunction, pressure fluid escaping from the pressure chamber of the hydraulic power booster is prevented and is fed to the unpressurized supply reservoir. Further, the brake system of the present invention provides for the safety valve to be switchable to its closed position additionally be means of a fluid level gauge place in the unpressurized supply reservoir. In a like embodiment there is no dynamic fluid flow into the static brake circuits during brake slip control, since noramlly an inadmissibly great drop of the fluid level in the unpressurized supply reservoir leads to suspect a defect in the brake system. According to an advantageous embodiment of the present invention, the pressure switch connectible by way of the safety valve with the auxiliary pressure source is set to a switching pressure which is below the pressure at which the brake-actuating members are applied.

BRIEF DESCRIPTION OF THE DRAWING

One embodiment of this invention will be described in more detail in conjunction with the accompanying drawing wherein.

DETAILED DESCRIPTION

Figure 1:
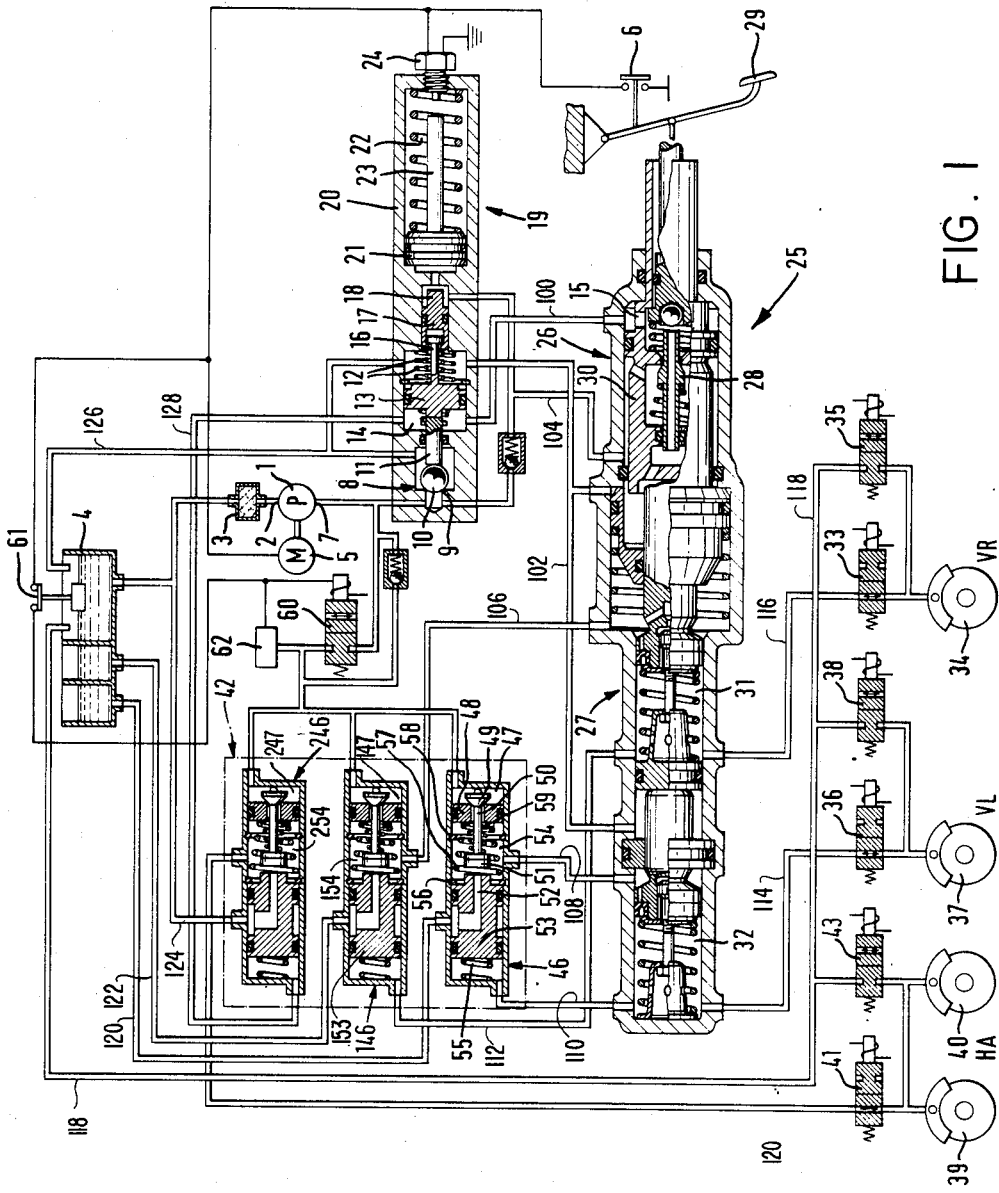
FIG. 1 illustrates a schematic diagram of the brake system in accordance with the present invention.
Figure 2:
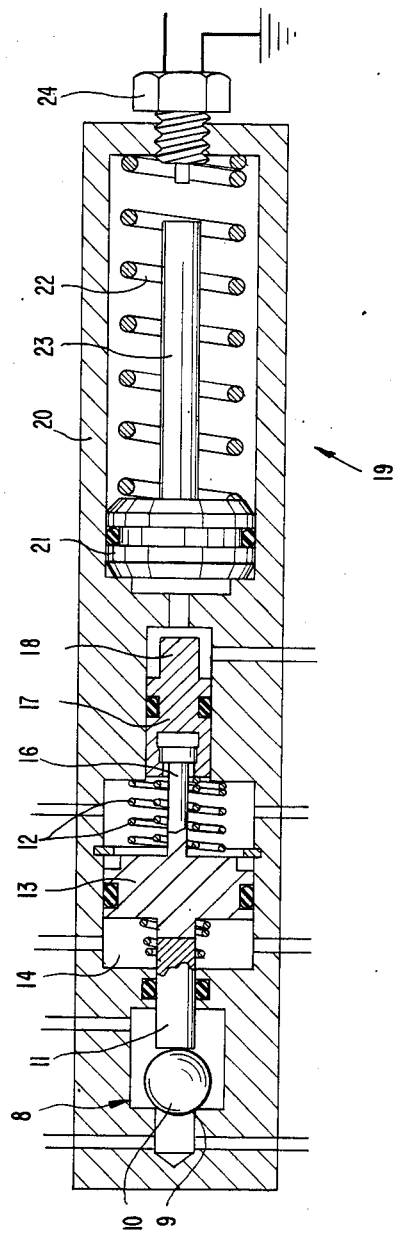
FIGS. 2, 3 and 4 are enlarged views of the corresponding elements of FIG. 1.
Figure 3:
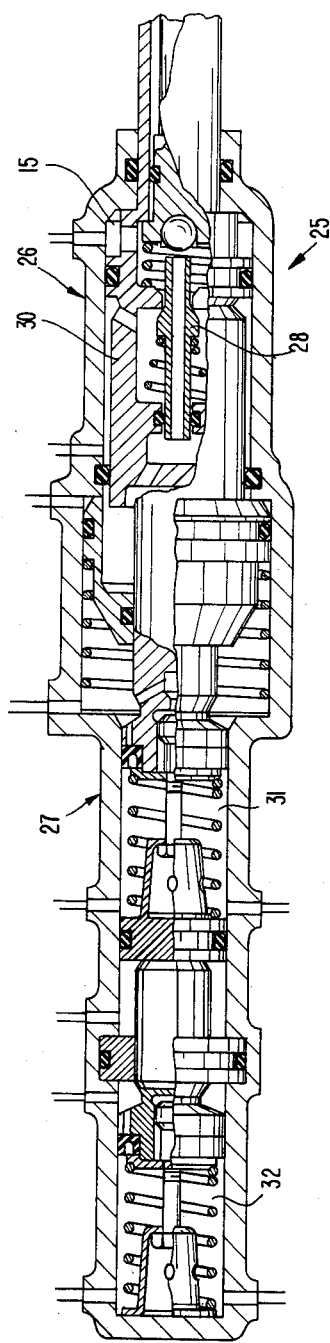
Figure 4:
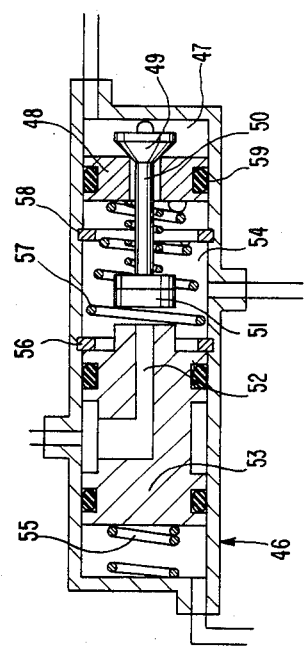

In the drawing, reference numeral 1 designates a pressure fluid pump, the suction side 2 of which communicates by way of a fluid filter 3 with an unpressurized supply reservoir 4. The pressure fluid pump 1 can be driven by an electric motor 5, and the electric motor 5 can be switched on by a brake pedal contact 6.

Connected to the pressure side 7 of the pressure fluid pump 1 is a pressure-relief valve 8 which, in the event of a predetermined fluid volume being exceeded within the pressure fluid pump 1, returns a certain portion of pressure fluid to the unpressurized supply reservoir 4. The pressure-relief valve 8 comprises a valve seat 9, against which a valve ball 10 can bear. The valve ball 10 is applied to seat 9 by the force of a valve piston 11 in the closing direction of the valve passage 9, 10. The piston 11 is held in abutment on the valve ball 10 by compression springs 12 when the brake is not applied. Arranged coaxially in relation to the piston 11 is a drive piston 13, through which the forces of the compression springs 12 are transmitted onto the piston 11. The valve and drive pistons 11, 13 and a corresponding housing form an annular housing chamber 14 which communicates by a line 100 with a pressure chamber 15 of a hydraulic power booster 26.

The end of drive piston 13 (to the right in the drawing) has an extension 16 engaging another piston 17. A valve closure member 18 formed at the right-hand end of said piston 17 permits control of a connection between the pressure side 7 of the pressure fluid pump 1 and a pressure accumulator 19.

The pressure accumulator 19 comprises a housing 20 in which an accumulator piston 21 is guided slidably against the force of a compression spring 22. Likewise the accumulator piston 21 includes at its right-hand end an extension 23 which serves to actuate an electric contact 24. As soon as a predetermined pressure has developed in the pressure accumulator 19, piston 21 will move to the right to actuate contact 24, shutting off drive motor 5 of the pressure fluid pump 1.

A braking pressure generator 25 is composed of a hydraulic power booster 26 and a tandem master cylinder 27 connected downstream thereof. The hydraulic power booster 26 is furnished with an open-center system throttle valve 28 which allows a pressure porportional to the actuating force on brake pedal 29 to develop in the booster's pressure chamber 15. At a predetermined pressure level in pressure chamber 15, a booster piston 30 is displaced in the actuating direction so that likewise the working chamber 31, 32 of the tandem master cylinder 27 will be exposed to pressure. An electromagnetically actuable two-way/two-position directional control valve 33 normally assumes an opened position. A wheel brake 34 is connected by valve 33 to the working chamber 31 of the tandem master cylinder 27. Brake 34 preferably is placed at the front axle of the automotive vehicle. The two-way/two-position directional control valve 33 is switched to assume its closed position by means of a brake slip control electronic circuit (not shown). Connected between the wheel brake 34 and the unpressurized supply reservoir 4 is another two-way/two-position directional control valve 35 which normally adopts its closed position. When valve 35 is open a connection can be established between the wheel brake 34 and the unpressurized supply reservoir 4. Valve 35 is also controlled by control signals issued by the slip control electronic circuit. Another wheel brake 37 is connected by a two-way/two-position directional control valve 36 to the working chamber 32 of the tandem master cylinder 27. Brake 37 preferably is disposed at the front axle of the automotive vehicle as well. A connection also can be established between th wheel brake 37 and the unpressurized supply reservoir 4 by way of a two-way/two-position directional control valve 38. In design and function, valve 38 corresponds to the valve 35. Rear wheels brakes 39, 40 at the rear axle of the automotive vehicle are hydraulically interconnected and are connected to a valve assembly 42 by way of a two-way/two-position directional control valve 41. By way of another two-way/two-position directional control valve 43, a hydraulic connection can likewise be provided between the wheel brakes 39, 40 and the unpressurized supply reservoir 4.

The valve assembly 42 is composed of identically designed valves 46, 146, 246 whose design and mode of function will be explained in the following by way of example of the valve 46. Valve 46 is furnished with a chamber 47 which is connectible to the pressure side 7 of the pressure fluid pump 1. Chamber 47 is confined by an annular piston 48, slidable to the left when viewed in the drawing, and by a valve seat 49. Formed on the valve seat 49 is a tappet 50 carrying a closing member 51. The closing member 51 forms a valve passage with a pressure fluid channel 52 in a piston 53, that is arranged coaxially to the annular piston 48. A valve chamber 54 normally is in communication with the unpressurized supply reservoir 4 by channel 52, but this can be shut off by closing member 51. The piston 53 is normally kept against a stop 56 by the force of a bias compression spring 55. Piston 53 thereby assumes a position on the right, when viewed in the drawing. A compression spring 57 is clamped between the stop 56 and the annular piston 48. Spring 57 normally ensures that annular piston 48 adopts an end position on the right. Displacement of the annular piston 48 to the left is confined by a stop 58. Another compression spring 59, wich acts in the closing direction of the valve passage 49, 48, is clamped between annular piston 48 and closing member 51.

Connected to the pressure side 7 of the pressure fluid pump 1 is a safety valve 60 which is designed as a two-way/two-position directional control valve. By way of the safety valve 60, a connection can be established between the pressure side 7 of the pressure filled pump 1 and the chambers 47, 147, 247. The safety valve 60 can be switched by the pedal contact 6 allocated to the brake pedal 29 to assume its opened position as long as the fluid level in the unpressurized supply reservoir 4 has not fallen below a predeterminable level. The fluid level in the unpressurized supply reservoir is monitored by a contact 61. Contact 61, which is arranged in series with the pedal contact 6, adopts an opened position if the fluid level drops inadmissibly low. Furthermore, the safety valve 60 is switchable by a pressure monitor 62 to assume its closed position as soon as the pressure at the pressure side 7 of the pressure fluid pump 1 falls below a predetermined value.

Hereinbelow, the mode of operation of the brake system described will be explained in more detail, starting from an operating condition in which the pressure accumulator 19 is discharged due, for instance, to a long period of nonuse of the automotive vehicle. Therefore, when the automotive vehicle is put into operation, the electric motor drive 5 of the pressure fluid pump 1 is set to operate by the closed contact 24 so that pressure fluid is supplied into the pressure accumulator 19. In the presence of an elevated hydraulic pressure, for example 50 bar., in the pressure accumulator 19, the accumulator piston 21 displaces to the right so that contact 24 is opened, switching off the drive 5 of the pressure fluid pump 1.

But upon application of the brake pedal 29, contact 6 is closed, again switching on the drive 5 of the pressure fluid pump. Simultaneously, pressing the brake pedal 29 causes the open-center system throttle valve 28 of the hydraulic power booster 26 to open, and proportional hydraulic pressure develops in the pressure chamber 15 of the hydraulic power booster 26 thereby. The volume necessary for the hydraulic power boosting will be taken from the pressure accumulator 19 in the period of start-up of the pressure fluid pump 1. As soon as pressure level in the pressure chamber 15 of the hydraulic power booster 26 has exceeded a predetermined level, the annular housing chamber 14 likewise will be pressurized. This, on the one hand, causes the drive piston 13 to be displaced to the right, whereby the valve closing member 18 is moved to assume a right-hand end position. This prevents further charging of the accumulator. In addition, piston 11 is pressurized, which keeps the valve ball 10 in abutment on the valve seat 9. This precludes a connection between the pressure side 7 of the pressure fluid pump 1 and the unpressurized supply reservoir in the instantaneous operating condition.

Furthermore, it is assumed that a sufficient amount of fluid is available in the unpressurized supply reservoir 4. Hence, the electric contact 61 is closed as well. Subsequently, the safety valve 60 is switched open, providing a connection between the chambers 47, 147, 247 and the pressure side 7 of the pressure fluid pump 1. As soon as a specific predetermined pressure level is exceeded in the pressure chamber 15 of the hydraulic power booster 26, the booster piston 30 will displace in the brake-actuating direction. This causes the working chambers 31, 32 of the tandem master cylinder 27 and, respectively, the wheel brakes 36, 38, 33, 35 connected thereto to be pressurized. The respective pressure prevailing at the pressure side 7 of the pressure fluid pump 1, for instance, has an effect on the valve 46 of the valve assembly 42 such that the annular piston 48 together with the valve closing member 49 is shifted to the left. Piston 48 moves left until the closing member 51 closes the pressure fluid channel 52. Upon further pressure rise in the chamber 47, the valve formed by 48, 49 assumes an opened position in which the hydraulic pressure at the outlet 7 of the pressure fluid pump 1 propagates to the valve chamber 54 and to the tandem master cylinder 27, respectively. At the same time, the pressure prevailing in the working chamber 32 of the tandem master cylinder 27 acts upon the piston 53 of the valve 46.

According to the present invention, the working chambers 31, 32 of the tandem master cylinder 27 are activated by the pressure built up in the pressure chamber 15 of the hydraulic power booster 26 already prior to critical slip values being present at any one or at several of the vehicle wheels 39, 40, 37, 34.

In the following, a case of malfunction will be considered in which insufficient pressure is available at the pressure side 7 of the pressure fluid pump 1 in spite of the drive 5 being switched on. Then, the pressure monitor 62 ensures that the safety valve switches to its closed position (as can be appreciated by reference to the drawing) so that the small amount of fluid escaping from the pressure side 7 of the pressure fluid pump 1 is in any case fed to the hydraulic power booster 26. On the other hand, if due to a leakage in the brake system described the fluid level in the unpressurized supply reservoir 4 drops inadmissibly low, the contact 61 then moves to an opened position. This circumstance also results in the safety valve 60 adopting a closed position.

A case of malfunction can also be assumed in which there is a defect in the brake circuit connected to the working chamber 32 of the tandem master cylinder 27. For example, suppose due to leakage, no pressure can develop in the working chamber 32 of the tandem master cylinder 27. Therefore, the piston 53 of valve 46 can be displaced to the left, when viewed in the drawing, by compression spring 57 in opposition to the force of the compression spring 55. The valve passage 51, 52 back to the reservoir 4 remains opened when the valve passage 48, 49 is closed. Consequently, with an increased pedal travel, an anti-locking function is easily possible in the other brake circuits.

What is claimed is:

1. A hydraulic vehicle brake system with anti-locking, wherein a braking pressure generator (25) comprising a hydraulic power booster (26) and a master cylinder (27) connected downstream thereof is employed for the pressure supply of the brake circuits, wherein wheel brakes (34, 37) are connected to the pressurizable working chambers (31, 32) of the braking pressure generator by way of first valves (33, 36), and wherein the respective working chambers (31, 32) are connectible with an auxiliary pressure source (1) by way of second valves (147, 47), a third valve (60) being interposed, between the auxiliary pressure source and the second valves, which can be switched to assume an open position in response to a pedal contact and a predetermined minimum pressure of the auxiliary pressure source, wherein the second valves (147, 47) are provided as double seat valves of the same kind, and include a piston (153, 53) which is displaceable by the pressure in the respective brake circuit and by which a hydraulic connection is provided in the brake pedal's release position between the respective working chamber (31, 32) and an unpressurized supply reservoir (4).

2. A hydraulic brake system as claimed in claim 1, wherein the third valve (60) normally assumes a closed position and is adapted to be switched to its opened position on brake application by means of an electrical contact (6) associated with the brake pedal (29).

3. A hydraulic brake system as claimed in claim 1, wherein the auxiliary pressure source (1) is connectible to a pressure sensitive switch (62) by way of the third valve (60), and wherein the pressure switch (62) interrupts an activating current supply to the third valve (60) in the event of the pressure of the auxiliary energy source (1) falling below a predetermined level.

4. A hydraulic brake system as claimed in claim 2, wherein the third valve (60) is additionally switchable to a closed position by means of a fluid level gauge (61) arranged in the unpressurized supply reservoir (4).

5. A hydraulic brake system as claimed in claim 3, wherein the pressure switch (62) is set to a threshold switching pressure which is below the pressure at which the brake-actuating members are applied.

* * * * *